(12) United States Patent  
Kachi (10) Patent No.: US 7,108,599 B2
(45) Date of Patent: Sep. 19, 2006

(54) VEHICLE AIR CONDITIONING SYSTEM HAVING DOOR DRIVE MECHANISM

(75) Inventor: Michihiro Kachi, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/985,523

(22) Filed: Nov. 11, 2004

(65) Prior Publication Data

US 2005/0107027 A1    May 19, 2005

(30) Foreign Application Priority Data

Nov. 13, 2003    (JP) .............................. 2003-383995

(51) Int. Cl.
*B60S 1/58* (2006.01)
(52) U.S. Cl. .................. 454/121; 454/69; 454/156; 165/42; 165/43; 165/202; 251/250.5; 251/288
(58) Field of Classification Search .................. 454/69, 454/121, 156, 159–161; 165/202–204, 42, 165/43; 251/250.5, 288; 74/89.18, 413
See application file for complete search history.

(56) References Cited

U.S. PATENT DOCUMENTS

| 6,354,935 B1 | 3/2002 | Kurokawa et al. |
| 6,431,266 B1* | 8/2002 | Han .......................... 165/204 |
| 6,827,141 B1* | 12/2004 | Smith et al. ................ 165/202 |

FOREIGN PATENT DOCUMENTS

JP         04162285 A   *   6/1992

* cited by examiner

Primary Examiner—Gregory Wilson
(74) Attorney, Agent, or Firm—Harness, Dickey & Pierce, PLC (57) ABSTRACT

A pitch circle radius of a driving side gear of a drive mechanism of an air mix door is continuously and progressively increased from a maximum heating position side part to a maximum cooling position side part. A pitch circle radius of a driven side gear of the drive mechanism is continuously and progressively increased from a maximum cooling position side part to a maximum heating position side part.

8 Claims, 5 Drawing Sheets

MAXIMUM COOLING STATE

FIG. 3

MAXIMUM HEATING STATE

VEHICLE AIR CONDITIONING SYSTEM HAVING DOOR DRIVE MECHANISM

CROSS REFERENCE TO RELATED APPLICATION

This application is based on and incorporates herein by reference Japanese Patent Application No. 2003-383995 filed on Nov. 13, 2003.

BACKGROUND OF THE INVENTION

1. Field of the Invention

The present invention relates to a door drive mechanism of an air conditioning system for a vehicle, and particularly to the door drive mechanism of the air conditioning system, which drives a door, such as an air mix door, through a gear mechanism.

2. Description of Related Art

Japanese Unexamined Patent Publication No. 2000-355212, which corresponds to U.S. Pat. No. 6,354,935, discloses a door drive device, which drives a door, such as an air mix door, of an air conditioning system (also referred to as a vehicle air conditioning system) for a vehicle.

The above door drive device includes a door drive gear, which is rotated by a drive apparatus, such as a motor. The door drive gear is meshed with a rack, which is integrated with the air mix door. When the door drive gear is rotated by the drive apparatus, the air mix door is slid together with the rack.

Figure 5:
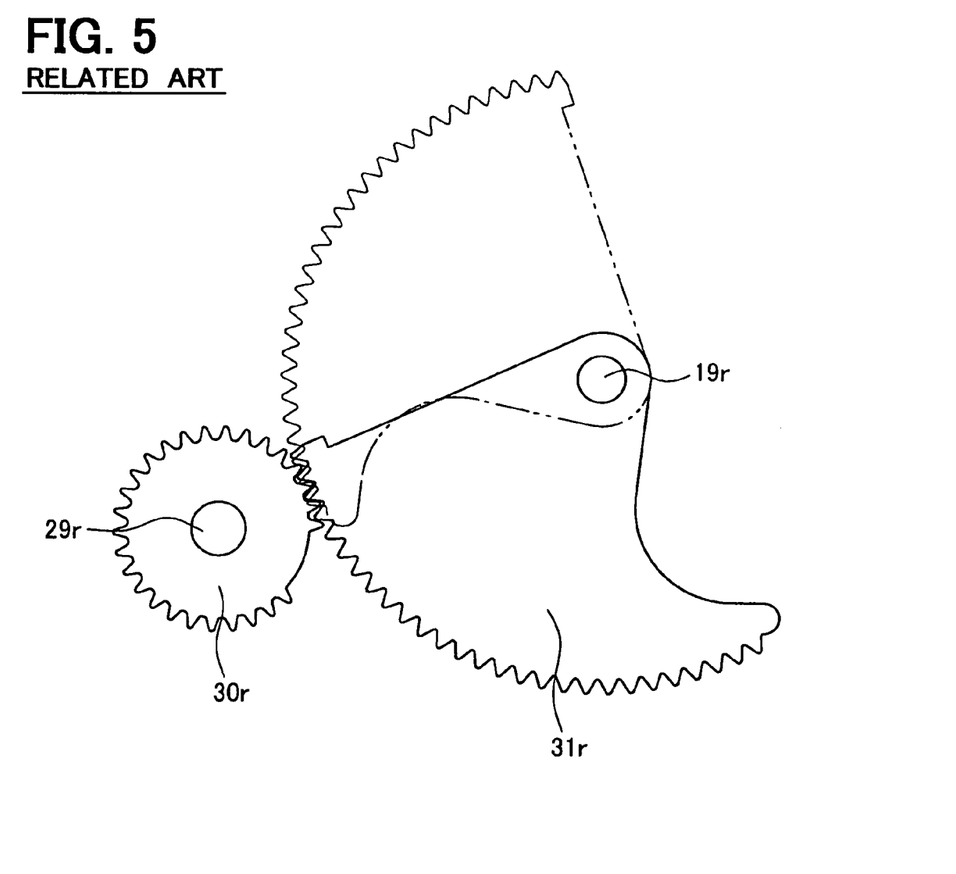
FIG. 5 is a front view of an air mix door drive gear mechanism of a previously proposed air conditioning system.

FIG. 5 is an air mix door drive gear mechanism of a previously proposed air conditioning system, which is different from that of the above Japanese Unexamined Patent Publication No. 2000-355212. In the air mix door drive gear mechanism, a driving side gear 30r is secured to an output shaft 29r of a drive servo motor (not shown) and rotates integrally with the output shaft 29r. A driven side gear 31r, which is meshed with the driving side gear 30r, is secured to a rotatable shaft 19r of an air mix door (not shown) and rotates integrally with the rotatable shaft 19r.

The driving side gear 30r is formed into a circular shape having a constant pitch circle radius (i.e., a constant radius of a pitch circle). Corresponding to this constant pitch circle radius of the driving side gear 30r, a pitch circle radius of the driven side gear 31r is also constant. An operable angular range of the air mix door is less than 360 degrees, and thus the driven side gear 31r has a fan shape, which has an arcuate outer peripheral part. The arcuate outer peripheral part of the driven side gear 31r extends along an imaginary arc that is centered in the rotational axis of rotatable shaft 19r.

Figure 6:
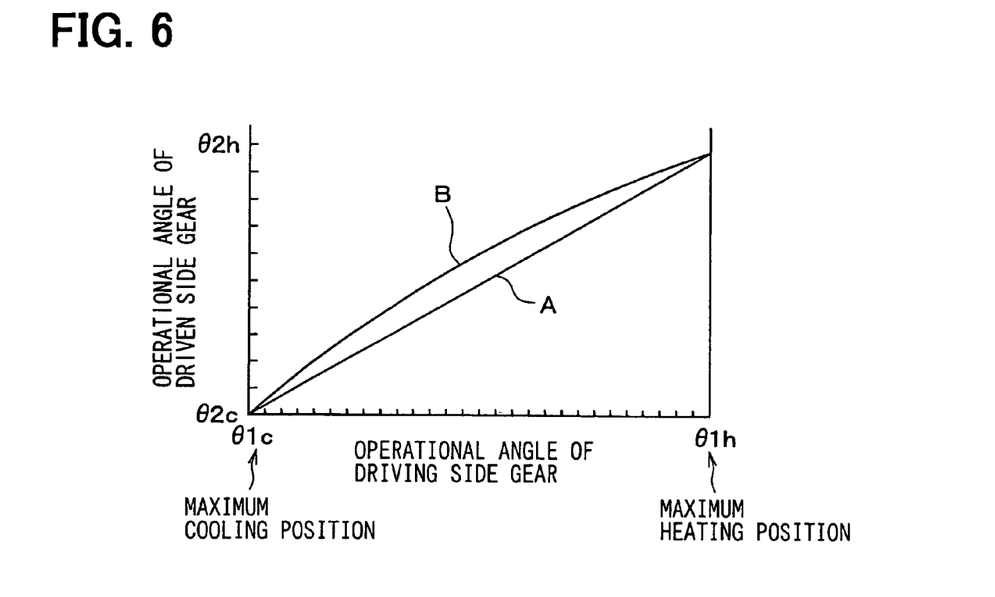
FIG. 6 is a characteristic diagram showing operation of the gear mechanism of the embodiment of the present invention and operation of the gear mechanism of the previously proposed air conditioning system.

As discussed above, both the pitch circle radius of the driving side gear 30r and the pitch circle radius of the driven side gear 31r are constant, so that a linear relationship exists between an operational angle of the driven side gear 31r and an operational angle of the driving side gear 30r, as indicated by a characteristic A (a characteristic line indicating a relationship between an operational angle of the driving side gear and an operational angle of the driven side gear) in FIG. 6.

This will cause the following disadvantages in terms of control of the temperature (hereinafter referred to as an outlet air temperature) of air to be discharged from the vehicle air conditioning system into the passenger compartment. In a maximum heating position of the air mix door, the air mix door fully closes a cool air passage (an air passage that bypasses a heating heat exchanger) and fully opens a warm air passage (an air passage that extends through the heating heat exchanger) in a unit case. When the air mix door is rotated from the maximum heating position to a temperature control range where both the cool air passage and the warm air passage are opened, the air mix door opens the cool air passage. Since this cool air passage extends along the entire extent of the unit case in a width direction of the unit case (a left-right direction of a vehicle), this movement of the air mix door results in a rapid increase in a flow rate of cool air, which flows through the cool air passage.

Figure 7:
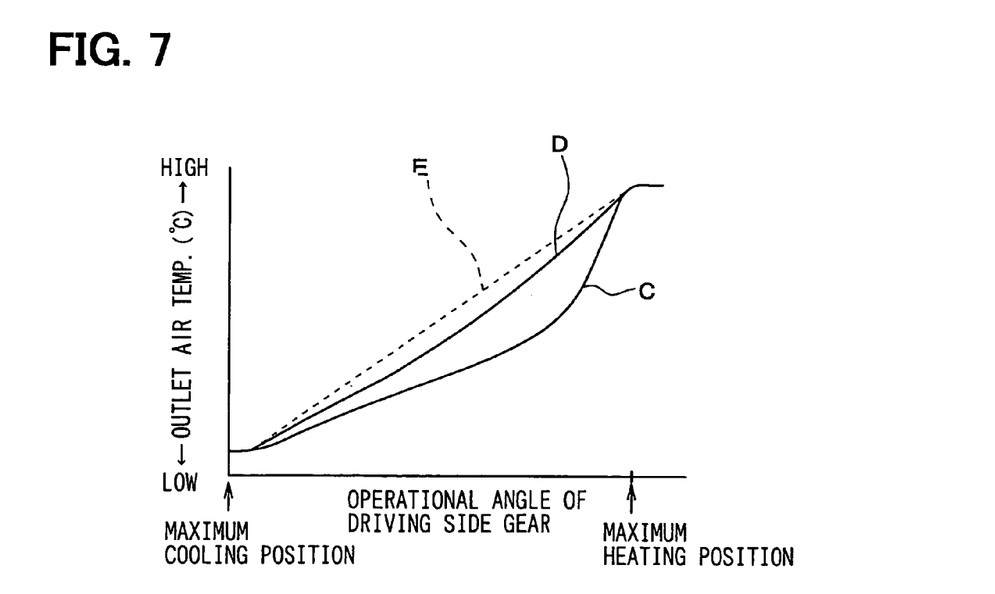
FIG. 7 is a characteristic diagram showing the outlet air temperature according to the embodiment of the present invention and also the outlet air temperature of the previously proposed air conditioning system.

Thus, when the air mix door is driven from the maximum heating position to the temperature control range, the outlet air temperature of the air conditioning system is rapidly reduced, as indicated by a characteristic C (a characteristic line indicating a relationship between an operational angle of the driving side gear and the outlet air temperature of the air conditioning system) in FIG. 7, resulting in poor controllability of the outlet air temperature.

To address such a disadvantage, it is conceivable to add an auxiliary link mechanism between the driven side gear 31r and the rotatable shaft 19r of the air mix door to reduce the amount of change in the operational angle of the driven side gear near the maximum heating position of the air mix door to reduce the amount of change in the rotational position of the air mix door, as indicated by a characteristic B (a characteristic line indicating a relationship between an operational angle of the driving side gear and an operational angle of the driven side gear) of FIG. 6. However, this requires the addition of the auxiliary link mechanism besides the gears 30r, 31r. Thus, an additional space for accommodating the auxiliary link mechanism needs to be provided, and the addition of the auxiliary link mechanism causes an increase in manufacturing costs.

In the above described air conditioning system recited in Japanese Unexamined Patent Publication No. 2000-355212, a tooth depth of the tooth located at the end of the door drive gear or a tooth depth of each of the teeth located near the end of the door drive gear is increased relative to the rest of the teeth. Also, a tooth depth of the tooth located at each of the ends of the rack or a tooth depth of the teeth located near each of the ends of the rack is increased relative to the rest of the teeth. However, this structure is intended to move the air mix door in a direction perpendicular to a slide direction of the air mix door at the end of a slide path of the air mix door, and there is no structure of the gear mechanism disclosed to improve the controllability of the outlet air temperature.

SUMMARY OF THE INVENTION

The present invention addresses the above disadvantage. Thus, it is an objective of the present invention to provide a vehicle air conditioning system having a door drive gear mechanism, which permits a higher degree of freedom in designing of a characteristic showing a relationship between an operational angle of a driven side gear and an operational angle of a driving side gear.

More specifically, it is an objective of the present invention to provide a vehicle air conditioning system of an air mix type having a door drive gear mechanism, which permits improvement in a control characteristic of an outlet air temperature.

To achieve the objective of the present invention, there is provided a vehicle air conditioning system, which includes a case, a door means and a door drive mechanism. The case conducts air toward a passenger compartment of a vehicle.

The door means is for controlling a flow of air in the case. The door drive mechanism drives the door means. The door drive mechanism includes a driving side gear and a driven side gear. The driving side gear includes a toothed portion, which has a plurality of teeth. The driven side gear includes a toothed portion, which has a plurality of teeth and is meshed with the toothed portion of the driving side gear. The driven side gear is connected to the door means and is rotated to drive the door means upon rotation of the driving side gear. A pitch circle radius of the toothed portion of the driving side gear progressively changes in a predetermined circumferential direction of the driving side gear. A pitch circle radius of the toothed portion of the driven side gear progressively changes in conformity with a change in the pitch circle radius of the toothed portion of the driving side gear.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
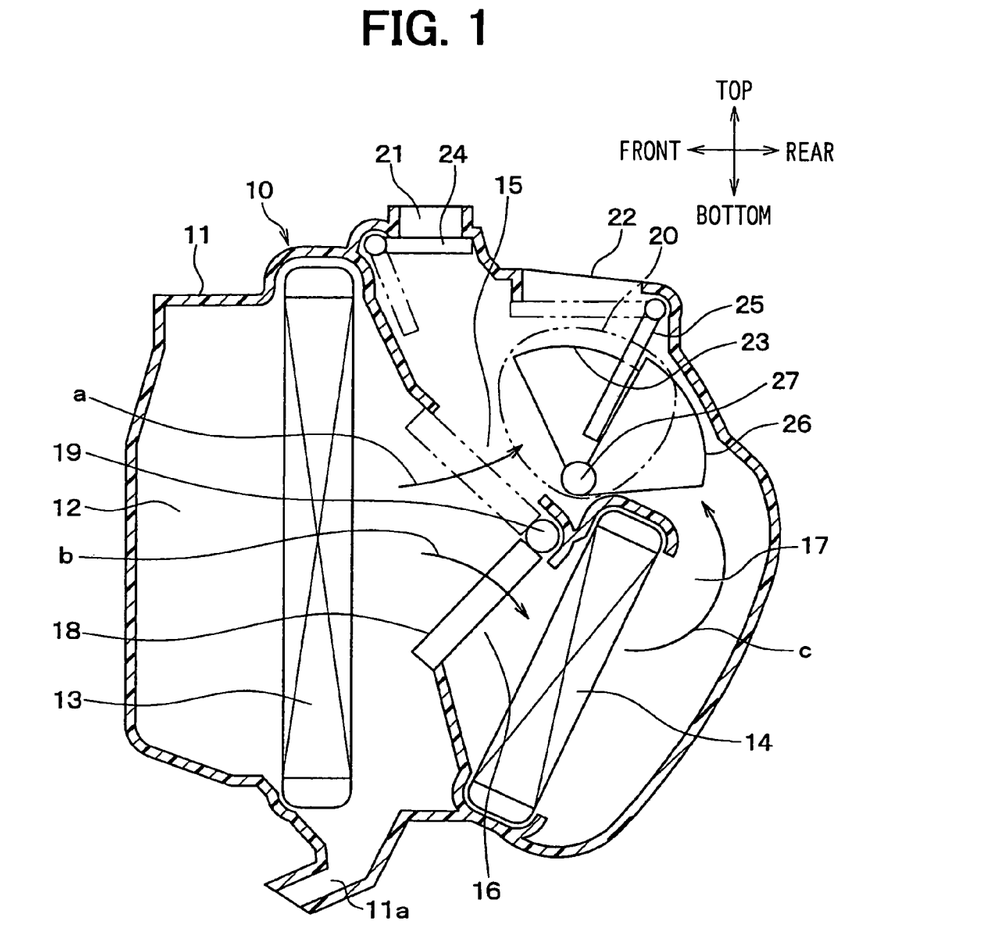
FIG. 1 is a cross sectional view of an air conditioning main unit according to an embodiment of the present invention.
Figure 2:
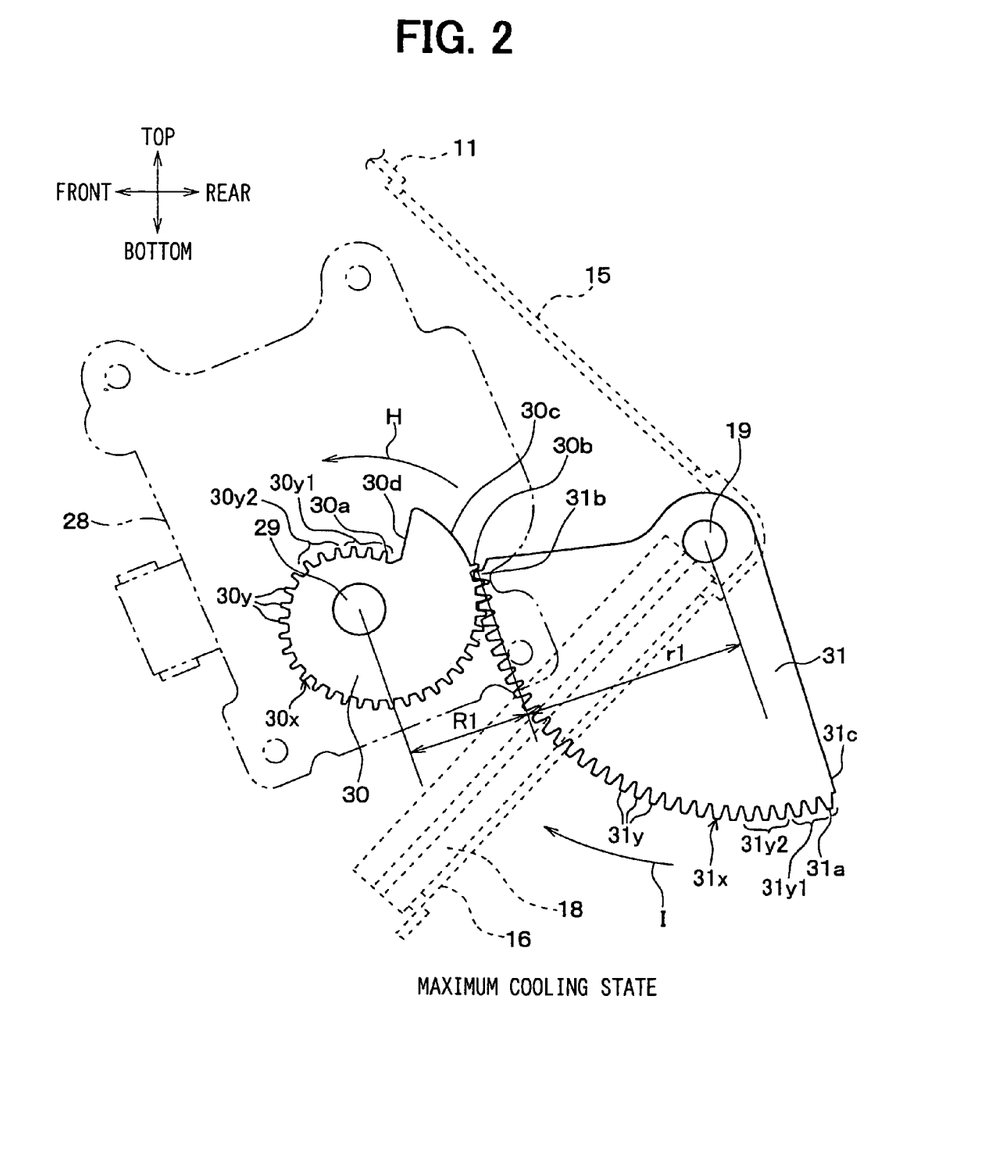
FIG. 2 is a front view of an air mix door drive gear mechanism at the time of maximum cooling operation according to the embodiment.
Figure 3:
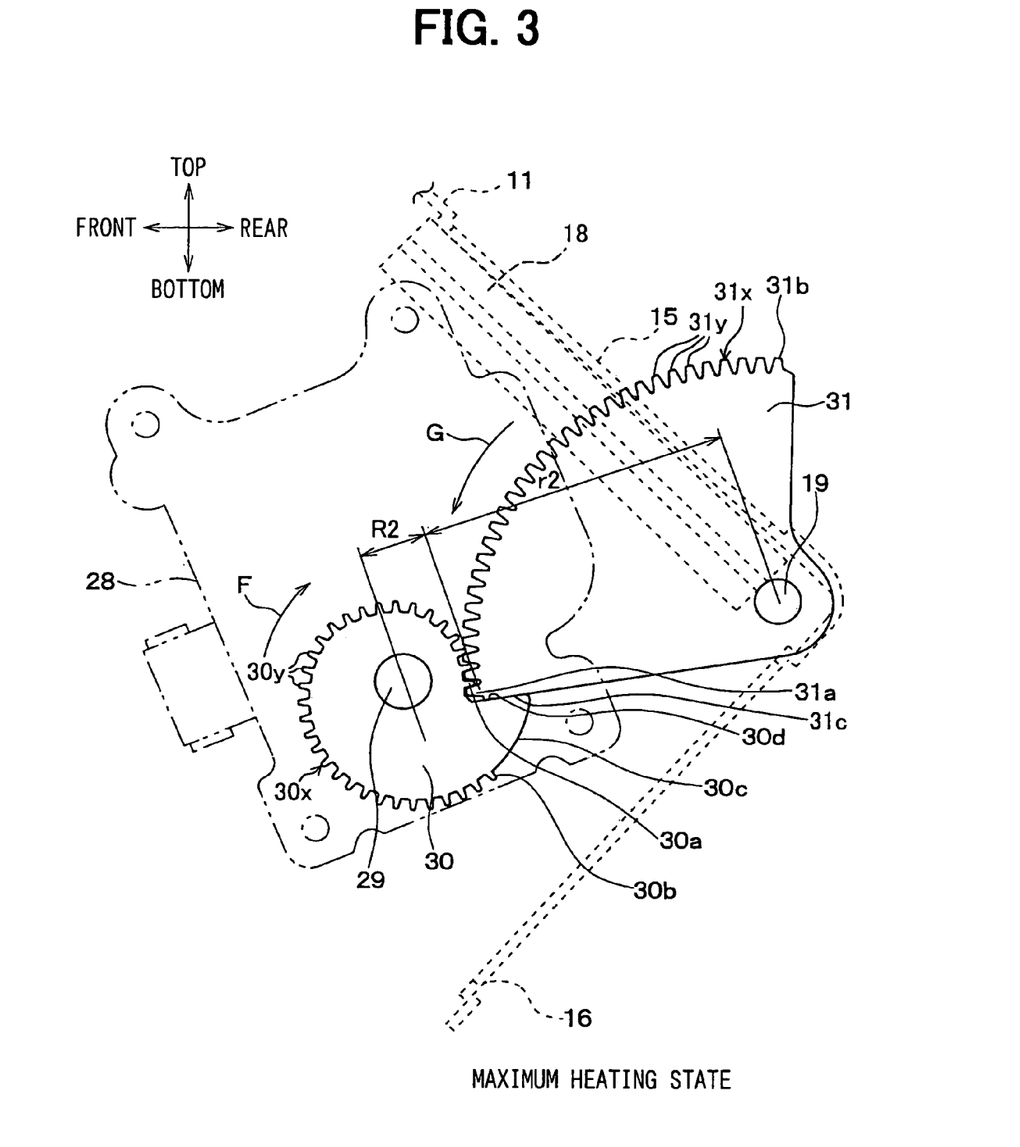
FIG. 3 is a front view of the air mix door drive gear mechanism at the time of maximum heating operation according to the embodiment.

An embodiment of the present invention will be described with reference to FIGS. 1 to 3. FIG. 1 shows a cross sectional view of an air conditioning main unit 10 of a passenger compartment air conditioning unit of a vehicle air conditioning system of the present embodiment. The passenger compartment air conditioning unit of the present embodiment includes the air conditioning main unit 10 and a blower unit (not shown). The blower unit blows air to the air conditioning main unit 10. In FIGS. 1 to 3, front, rear, top and bottom directional arrows indicate corresponding directions upon installation of the air conditioning main unit 10 in a vehicle.

The air conditioning main unit 10 is arranged at a back side of a front instrument panel of a passenger compartment of the vehicle at a transverse center of the passenger compartment (i.e., a center in a left-right direction of the passenger compartment). The blower unit is offset from the transverse center of the passenger compartment at a front passenger seat, which is located at one side of the passenger compartment.

As is well known in the art, the blower unit includes an inside air/outside air switching box and a blower. Air, which is drawn into the blower unit, is switched between outside air and inside air through opening and closing of an outside air intake opening and an inside air intake opening by operation of an inside air/outside air switching door provided in the inside air/outside air switching box. Then, the air, which is drawn into the blower unit, is blown by the blower toward the air conditioning main unit 10. The blower is an electric centrifugal blower, which is driven by an electric motor.

Next, the air conditioning main unit 10 will be described in detail. The air conditioning main unit 10 includes a resin case 11, which forms an air passage. The case 11 is made of two case parts. The case parts are divided at a dividing surface located in the center of the case 11 in the left-right direction of the vehicle (in the transverse direction of the vehicle) and are connected together by an appropriate fixing means (not shown), such as screws or clips made of a metal spring material.

An air intake space 12 is formed in the foremost part of the case 11 and receives the air blown by the blower. The air supplied into the air intake space 12 flows in the case 11 from a vehicle front side to a vehicle rear side.

The case 11 receives an evaporator 13 and a heater core 14, which are arranged in series in this order from an upstream side to a downstream side of an air flow. As is well known in the art, the evaporator 13 is a cooling heat exchanger, in which low pressure refrigerant of a refrigeration cycle of the air conditioning system absorbs heat and thus evaporates to cool the blown air, which is blown into the case 11 from the blower unit. A drain outlet 11a is provided in a bottom part of the case 11, which is located below the evaporator 13, to drain condensed water from the case 11.

The heater core 14 is a heating heat exchanger, at which the blown air in the case 11 is heated using hot liquid (engine coolant) that passes through the heater core 14. A cool air passage 15 is formed on an upstream side of the heater core 14 in the case 11. The air, which has passed the evaporator 13, flows through the cool air passage 15 while bypassing the heater core 14.

In the case 11, a warm air inlet passage 16 is formed below the cool air passage 15. The warm air inlet passage 16 is a passage that supplies air (cool air) b, which has passed through the evaporator 13, to the heater core 14. A warm air outlet passage 17 is formed on a downstream side (vehicle rear side) of the heater core 14. Warm air c, which has passed through the heater core 14, flows upwardly through the warm air outlet passage 17.

An air mix door 18 is arranged between the evaporator 13 and the heater core 14. The air mix door 18 is made of a plate door, which is secured to a rotatable shaft 19 to rotate together with the rotatable shaft 19. The rotatable shaft 19 extends in the left-right direction of the vehicle around the lower end of the cool air passage 15, i.e., around the top end of the heater core 14 and is rotatably supported by left and right side walls of the case 11.

The air mix door 18 has a door surface area that is larger than a passage opening cross sectional area of the cool air passage 15 and also a passage opening cross sectional area of the warm air inlet passage 16, so that the air mix door 18 can effectively open and close each of the cool air passage 15 and the warm air inlet passage 16. An air mixing space 20 is provided above the heater core 14 in the case 11 to mix cool air "a", which has passed through the cool air passage 15, and the warm air "c", which is supplied from the warm air outlet passage 17.

In the case 11, a plurality of discharge openings 21–23 is provided on the vehicle rear side of the evaporator 13 at the upper side of the case 11. Conditioning air, which has passed through the air mixing space 20, is supplied to the discharge openings 21–23. These discharge openings 21–23 includes a defroster side opening 21, a face side opening 22 and a foot side openings 23. The defroster side opening 21 is opened in a top surface of the case 11 and is communicated with defroster discharge outlets (not shown) through a defroster duct (not shown). The conditioning air is discharged from the defroster discharge outlets toward a passenger compartment side inner surface of a front glass (a windshield) of the vehicle. The defroster side opening 21 is opened and closed by a defroster side door 24.

The face side opening 22 is opened in the top surface of the case 11 on the vehicle rear side of the defroster side opening 21. The face side opening 22 is communicated with face side discharge outlets (not shown) through a face side duct (not shown). The conditioning air is discharged from the face side discharge outlets toward an upper half of a body of a vehicle front side occupant seated in a front seat. The face side opening 22 is opened and closed by a face side door 25. Each of the face side door 25 and the defroster side door 24 is made of a rotatable plate door.

The foot side openings 23 open in the left and right side walls, respectively, of the case 11 and are located at a vertical location, which is above the heater core 14 and at which the air mixing space 20 is located in the case 11. Each foot side opening 23 is communicated to a corresponding foot side discharge outlet (not shown) through a corresponding foot side duct. The conditioning air is discharged from the foot side discharge outlet toward feet of the corresponding front side occupant. The left and right foot side openings 23 are opened and closed by left and right foot side doors 26, respectively.

Each foot side opening 23 has a fan shape, and the corresponding foot side door 26 has a corresponding fan shape. When the fan shaped foot side door 26 is rotated about a rotatable shaft 27 along a corresponding one of the left and right side walls of the case 11, the corresponding foot side opening 23 is opened and closed by the foot side door 26. A position of the foot side door 26, which is indicated by a solid line in FIG. 1, indicates a fully closed state of the foot side opening 23.

The above described doors 24–26 serve as discharge mode doors and are connected to a common discharge mode switching mechanism through a corresponding link mechanism (not shown) to achieve integral operation of these doors 24–26. The discharge mode switching mechanism is made of, for example, an actuator mechanism, which uses a servo motor.

Next, the door drive mechanism, which drives the air mix door 18, will be described with reference to FIGS. 2 and 3. FIG. 2 shows a maximum cooling state where the air mix door 18 is placed to fully open the cool air passage 15 and also to fully close the warm air inlet passage 16. FIG. 3 shows a maximum heating state where the air mix door 18 is placed to fully close the cool air passage 15 and also to fully open the warm air inlet passage 16. In FIGS. 2 and 3, among the components disposed outside of the left and right side walls of the case 11, a servo motor 28 is indicated by a dot-dot dash line, and each of a driving side gear 30 and a driven side gear 31 are indicated by a corresponding solid line. Also, in FIGS. 2 and 3, each of the components disposed within the case 11 is indicated by a corresponding dotted line.

The door drive mechanism includes the servo motor 28, which is an electric actuator. The servo motor 28 is provided to an outer surface of one of the left and right side walls of the case 11 at a position on the vehicle front side of the rotatable shaft 19 of the air mix door 18. A casing of the servo motor 28 is secured to the corresponding one of the left and right side walls by a fastening means, such as screws. A predetermined space is provided between the casing of the servo motor 28 and the corresponding side wall of the case 11 to receive the driving side gear 30.

An output shaft (a drive shaft) 29 of the servo motor 28 extends in the left-right direction of the vehicle in parallel to the rotatable shaft 19 of the air mix door 18. The output shaft 29 projects from the casing of the servo motor 28 toward the space, which is defined between the casing of the servo motor 28 and the side wall of the case 11. The driving side gear 30 is integrally secured to the projecting end of the output shaft 29, so that the output shaft 29 and the driving side gear 30 integrally rotate.

The driven side gear 31, which is meshed with the driving side gear 30, is integrally secured to the rotatable shaft 19 of the air mix door 18. More specifically, one end of the rotatable shaft 19 projects outward from the side wall of the case 11, and the driven side gear 31 is integrally secured to the one end of the rotatable shaft 19 to rotate integrally with the rotatable shaft 19.

Each of the driving side gear 30 and the driven side gear 31 is molded from resin and is shaped in such a manner that a pitch circle radius of the gear 30, 31 (i.e., a radius of the pitch circle of the gear 30, 31) is continuously and progressively changed from one circumferential side to the other circumferential side.

The shape of each gear 30, 31 will be described in greater detail. The driving side gear 30 includes a toothed portion 30x having a plurality of teeth 30y, and the pitch circle radius the toothed portion 30x of the driving side gear 30 is continuously and progressively changed from one circumferential side to the other circumferential side while maintaining its constant tooth module. Similarly, the driven side gear 31 includes a toothed portion 31x having a plurality of teeth 31y, and the pitch circle radius of the toothed portion 31x of the driven side gear 31 is continuously and progressively changed from one circumferential side to the other circumferential side while maintaining its constant tooth module.

Figure 4:
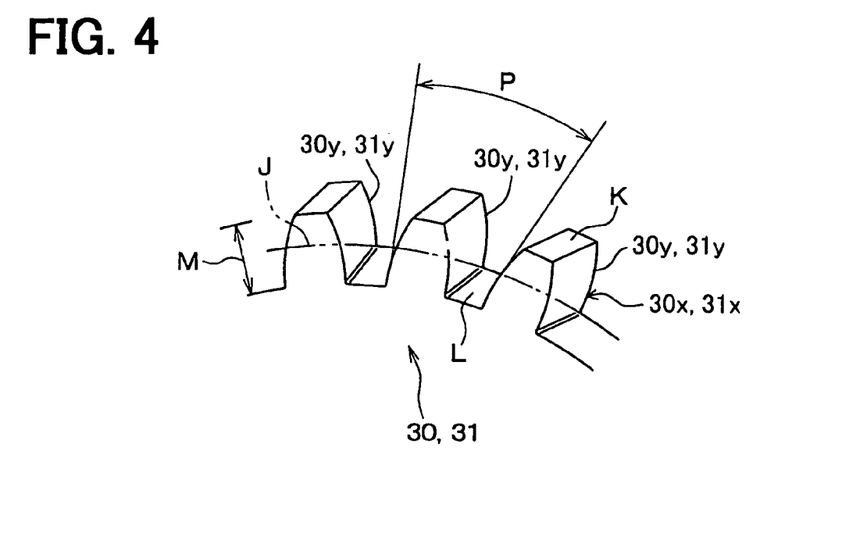
FIG. 4 is a partial enlarged view of a gear of the air mix door drive gear mechanism.

As indicated by a numeral J in FIG. 4, the pitch circle of the gear 30, 31 is an imaginary circle that passes a radial intermediate point of each tooth 30y, 31y of the gear 30, 31 between a top land K and a bottom land L of the tooth 30y, 31y (an imaginary circle that passes a point at or around a center of a tooth depth M of each tooth). The pitch circle is used to determine a circular pitch P of the teeth 30y, 31y of the gear 30, 31. The tooth module m is a reference for indicating a size of the tooth and is defined as $m=d/z$, where "d" is a diameter of the pitch circle J, and "z" is the number of the teeth 30y, 31y.

At the one circumferential side of the gear 30, the driving side gear 30 has a minimum pitch circle radius point (a maximum heating position side part) 30a, which is defined as a point where the pitch circle radius of the gear 30 is minimized. Furthermore, at the other circumferential side of the gear 30, the driving side gear 30 has a maximum pitch circle radius point (a maximum cooling position side part) 30b, which is defined as a point where the pitch circle radius of the gear 30 is maximized. The pitch circle radius of the gear 30 is continuously and progressively increased from the minimum pitch circle radius point 30a to the maximum pitch circle radius point 30b.

As described above, the driving side gear 30 is shaped such that the pitch circle radius continuously and progressively increases from the one circumferential side to the other circumferential side. Thus, an imaginary line, which passes through the top land of each tooth of the driving side gear 30, is spiral. That is, an outer peripheral part of the driving side gear 30 has a spiral shape.

In the driving side gear 30 of the present embodiment, a non-toothed smooth arcuate outer peripheral surface 30c, in which no tooth is formed, extends from the maximum pitch circle radius point 30b away from the toothed portion 30x toward the minimum pitch circle radius pint 30a side in a circumferential direction. A stopper surface 30d is formed in a circumferential end of the arcuate outer peripheral surface 30c and extends in a radial direction of the driving side gear 30.

The driven side gear 31 generally has the fan shape. At the base or pivot of the fan shape, the rotatable shaft 19 is integrally secured to the driven side gear 31. The pitch circle radius of the driven side gear 31 is progressively changed in a manner that corresponds to the change in the pitch circle radius of the driving side gear 30.

More specifically, a maximum pitch circle radius point (a maximum heating position side part) 31a of the driven side gear 31 is provided at one circumferential side of the driven side gear 31, and a minimum pitch circle radius point (a maximum cooling position side part) 31b of the driven side gear 31 is provided at the other circumferential side of the driven side gear 31. The pitch circle radius of the driven side gear 31 is progressively reduced from the maximum pitch circle radius point 31a to the minimum pitch circle radius point 31b.

In each of the driving side gear 30 and the driven side gear 31 of the present embodiment, the pitch circle radius is progressively changed from the one circumferential side to the other circumferential side at a predetermined rate. That is, the pitch circle radius of the gear 30, 31 is changed at the constant change rate.

In the maximum cooling state of FIG. 2, the maximum pitch circle radius point 30b of the driving side gear 30 is meshed with the minimum pitch circle radius point 31a of the driven side gear 31. Thus, in the maximum cooling state, the pitch circle radius of the driving side gear 30 becomes a maximum radius R1, and the pith circle radius of the driven side gear 31 becomes a minimum radius r1. Thus, at this state, a pitch circle radius ratio is r1/R1.

In contrast, in the maximum heating state of FIG. 3, the minimum pitch circle radius point 30a of the driving side gear 30 is meshed with the maximum pitch circle radius point 31a of the driven side gear 31. Thus, in the maximum heating state, the pitch circle radius of the driving side gear 30 becomes a minimum radius R2, and the pith circle radius of the driven side gear 31 becomes a maximum radius r2. Thus, at this state, a pitch circle radius ratio is r2/R2. As is understood from FIGS. 2 and 3, the relationship of (r1/R1) <(r2/R2) is satisfied.

At the time of maximum heating shown in FIG. 3, the maximum pitch circle radius point 31a side circumferential end surface of the driven side gear 31, which extends in a radial direction of the driven side gear 31, contacts the stopper surface 30d of the driving side gear 30.

In the present embodiment, the amount of rotation of the servo motor 28 is adjusted based on a manual operation signal generated by the occupant. More specifically, a temperature adjusting manipulation member, which is manually operated by the occupant, is provided in the air conditioning control panel (not shown) arranged near the vehicle instrument panel. The amount of rotation of the servo motor 28 is adjusted through a motor drive circuit (not shown) based on an electric signal, which corresponds to the amount of operation of the temperature adjusting manipulation member. The temperature adjusting manipulation member is made of a dial type or lever type manipulation member.

Next, operation of the present embodiment will be described. When the temperature adjusting manipulation member of the air conditioning control panel (not shown) is manually set to the maximum heating position, the servo motor 28 is rotated to a corresponding rotational position, which corresponds to the maximum heating position of the temperature adjusting manipulation member, based on the electric signal that corresponds to the maximum heating position of the temperature adjusting manipulation member. Thus, an operational angle of the driving side gear 30 becomes an operational angle $\theta 1h$ of FIG. 6, which corresponds to the maximum heating position. Accordingly, an operational angle of the driven side gear 31 becomes an operational angle $\theta 2h$ of FIG. 6, which corresponds to the maximum heating position.

In this way, each of the driving side gear 30 and the driven side gear 31 is held in the corresponding rotational position shown in FIG. 3, and thus the air mix door 18 is driven to the maximum heating position (the position indicated by the dotted line in FIG. 3 and the position indicated by the dot-dot dash line in FIG. 1).

In the maximum heating position, the cool air passage 15 is fully closed by the air mix door 18, and the warm air inlet passage 16 is fully opened. Thus, the entire blown air, which has been blown by the blower unit and has passed through the evaporator 13, is supplied to the heater core 14 through the warm air inlet passage 16, which is held in the fully open state.

Therefore, the entire blown air is heated by the heater core 14 and thus becomes the warm air. Then, this warm air passes through the warm air outlet passage 17 on the downstream side of the heater core 14 toward the air mixing space 20. During the heating operation in the winter season, a foot mode for opening the foot side openings 23 is normally selected. Thus, the warm air in the air mixing space 20 is discharged from each corresponding foot side opening 23 toward the feet of the occupant to heat the passenger compartment.

When the temperature adjusting manipulation member of the air conditioning control panel (not shown) is manually displaced from the maximum heating position into a temperature control range to control the temperature (hereinafter referred to as an outlet air temperature) of the air, which is discharged into the passenger compartment, the servo motor 28 is rotated to rotate the driving side gear 30 in a clockwise direction F in FIG. 3. Therefore, the driven side gear 31 is rotated integrally with the air mix door 18 in a counter-clockwise direction G in FIG. 3.

In this way, the air mix door 18 opens the cool air passage 15. Thus, the cool air, which passes through the cool air passage 15, and the warm air, which passes the warm air inlet passage 16 and the warm air outlet passage 17 (correctively referred to as a warm air passage), are mixed in the air mixing space 20 to produce the conditioning air of the desired temperature, which is then discharged from the discharge opening(s), such as the foot side openings 23, into the passenger compartment.

Next, when the temperature adjusting manipulation member of the air conditioning control panel (not shown) is manually set to the maximum cooling position, the servo motor 28 is rotated to a corresponding rotational position, which corresponds to the maximum cooling position of the temperature adjusting manipulation member based on the electric signal that corresponds to the maximum cooling position of the temperature adjusting manipulation member. In this way, the operational angle of the driving side gear 30 becomes a operational angle θ1c of FIG. 6, which corresponds to the maximum cooling position. Accordingly, the operational angle of the driven side gear 31 becomes an operational angle θ2c of FIG. 6, which corresponds to the maximum cooling position.

In this way, each of the driving side gear 30 and the driven side gear 31 is held in the corresponding rotational position shown in FIG. 2, and thus the air mix door 18 is driven to the maximum cooling position (the position indicated by the dotted line in FIG. 2 and the position indicated by the solid line in FIG. 1).

In the maximum cooling position, the warm air inlet passage 16 is fully closed by the air mix door 18, and the cool air passage 15 is fully opened. Thus, the entire blown air, which has been blown by the blower unit, passes through the evaporator 13 and is cooled to form the cool air. Then, this entire cool air passes through the cool air passage 15 toward the air mixing space 20 side.

During the cooling operation in the summer season, a face mode for opening the face side opening 22 is normally selected. Thus, the cool air in the air mixing space 20 is discharged from the face side opening 22 toward the upper half of the body of the occupant to cool the passenger compartment.

When the driving side gear 30 is rotated from the maximum cooling position shown in FIG. 2 in a counterclockwise direction H in FIG. 2, the drive side gear 31 is rotated integrally with the air mix door 18 in a clockwise direction I in FIG. 2. Thus, the warm air inlet passage 16 is opened to move into the temperature control range.

Next, operation of the drive gear mechanism of the air mix door 18 will be described. In the present embodiment, the pitch circle radius of each of the driving side gear 30 and the driven side gear 31 is progressively changed from the one circumferential side to the other circumferential side. Furthermore, in the maximum cooling state, the pitch circle radius of the driving side gear 30 is set to the maximum radius R1, and the pitch circle radius of the driven side gear 31 is set to the minimum radius r1. Also, in the maximum heating state, the pitch circle radius of the driving side gear 30 is set to the minimum radius R2, and the pitch circle radius of the driven side gear 31 is set to the maximum radius r2.

Therefore, the pitch circle radius ratio (r2/R2) of the maximum heating state is larger than the pitch circle radius ratio (r1/R1) of the maximum cooling state. As a result, the change in the operational angle of the driven side gear 31 relative to the change in the operational angle of the driving side gear 30 will coincide with the characteristic B of FIG. 6. That is, the characteristic B is upwardly convexly curved in comparison to the comparative linear characteristic A of the previously proposed air conditioning system shown in FIG. 5.

According to the characteristic B of the present embodiment, in a range around the maximum heating state, the amount of change in the operational angle of the driven side gear 31 relative to the amount of change in the operational angle of the driving side gear 30 is made smaller in comparison to the maximum cooling state side range. As a result, in the range around the maximum heating state, the amount of change in the operational angle of the air mix door 18 relative to the amount of change in the operational angle of the driving side gear 30 is made small.

In this way, when the air mix door 18 is moved from the maximum heating state to the temperature control range side, an increase rate of the passage opening cross sectional area of the cooling passage 15 is limited to limit a rapid decrease in the outlet air temperature. As a result, according to the present embodiment, as indicated by D in FIG. 7, a control characteristic of the outlet air temperature relative to the operational angle of the driving side gear 30 can be approximated to an ideal characteristic E to improve the temperature control characteristic.

Furthermore, according to the present embodiment, the temperature control characteristic is improved by modifying the shape of the gears 30, 31 such that the pitch circle radius of each of the driving side gear 30 and the driven side gear 31 is progressively changed from the one circumferential side to the other circumferential side. Thus, addition of, for example, the auxiliary link mechanism is not required.

The above embodiment can be modified as follows.

(1) In the above embodiment, the pitch circle radius of each of the driving side gear 30 and the driven side gear 31 is continuously and progressively changed from the one circumferential side to the other circumferential side. However, the present invention is not limited to this. For example, the change rate of the pitch circle radius is not required to be constant. The change rate of the pitch circle radius can be varied based on the required operational angle change characteristic of the driven side gear 31.

More specifically, in the intermediate range between the maximum heating side end and the maximum cooling side end of each of the driving side gear 30 and the driven side gear 31, the change rate of the pitch circle radius may be increased, so that the change in the operational angle of the driven side gear 31 relative to the change in the operational angle of the driving side gear 30 is meandered.

Also, in the above embodiment, the pitch circle radius of each of the teeth 30y, 31y of the gear 30, 31 differs from the pitch circle radius of an adjacent one of the teeth 30y, 31y of the gear 30, 31. Alternatively, with reference to FIG. 2, three of the teeth 30y, 31y of each gear 30, 31 may be grouped as a first group 30y1, 31y1, which has a predetermined pitch circle radius, and next three of the teeth 30y, 31y of each gear 30, 31 may be grouped as a second group 30y2, 31y2, which has a predetermined pitch circle radius that is different from the predetermined pitch circle radius of the first group 30y1, 31y1, and so on.

(2) In the above embodiment, the pitch circle radius of the driving side gear 30 is continuously and progressively changed from the one circumferential side to the other circumferential side of the driving side gear 30. Alternatively, the pitch circle radius of the driving side gear 30 may be progressively changed only in a specific circumferential portion of the driving side gear 30, and the pitch circle radius of the driven side gear 31 may be progressively changed only in a specific circumferential portion of the driven side gear 31, which corresponds to the specific circumferential portion of the driving side gear 30.

For example, in the range at or near the maximum heating side end of each of the driving side gear 30 and the driven side gear 31, the pitch circle radius of the driving side gear 30 may be made small, and the pitch circle radius of the driven side gear 31 may be made large.

(3) In the above embodiment, the drive gear mechanism, which drives the air mix door 18, is described. However, the present invention can be applied to a drive gear mechanism of any other appropriate door, such as an inside air/outside air switching door (not shown) of the blower unit. In such a case, at the time of setting an inside air/outside air mixing mode, in which the inside air and the outside air are simultaneously introduced by operating the inside air/outside air switching door, a degree of freedom of setting a mixing ratio between the inside air and the outside air can be increased by the drive gear mechanism of the present invention.

(4) In the above embodiment, the non-toothed smooth arcuate outer peripheral surface 30c, in which no tooth is formed, extends from the maximum pitch circle radius point 30b toward the minimum pitch circle radius pint 30a side. However, it should be noted that this structure is only the example. Thus, it should be understood that the driving side gear 30 may be formed without forming the smooth arcuate outer peripheral surface 30c.

Additional advantages and modifications will readily occur to those skilled in the art. The invention in its broader terms is therefore not limited to the specific details, representative apparatus, and illustrative examples shown and described.

What is claimed is:

1. A vehicle air conditioning system comprising:
    a case that conducts air toward a passenger compartment of a vehicle;
    door means for controlling a flow of air in the case; and
    a door drive mechanism that drives the door means, wherein:
    the door drive mechanism includes:
        a driving side gear that includes a toothed portion, which has a plurality of teeth; and
        a driven side gear that includes a toothed portion, which has a plurality of teeth and is meshed with the toothed portion of the driving side gear;
    the driven side gear is connected to the door means and is rotated to drive the door means upon rotation of the driving side gear;
    a pitch circle radius of the toothed portion of the driving side gear progressively changes in a predetermined circumferential direction of the driving side gear;
    a pitch circle radius of the toothed portion of the driven side gear progressively changes in conformity with a change in the pitch circle radius of the toothed portion of the driving side gear, and
    a heating heat exchanger that is received in the case and heats air in the case, wherein:
    the case includes:
        a cool air passage that conducts cool air, which bypasses the heating heat exchanger;
        a warm air passage that conducts air, which passes through the heating heat exchanger; and
        a discharge opening that discharges air into the passenger compartment of the vehicle;
    the discharge opening discharges one of:
        the cool air that is conducted through the cool air passage;
        the warm air that is heated by the heating heat exchanger and is conducted through the warm air passage; and
        a mixture of the cool air conducted through the cool air passage and the warm air conducted through the warm air passage;
    through rotation of the driven side gear, the door means is driven between a maximum cooling position and a maximum heating position to adjust a flow rate ratio between the cool air conducted through the cool air passage and the warm air conducted through the warm air passage;
    in the maximum cooling position, the door means fully opens the cool air passage and fully closes the warm air passage;
    in the maximum heating position, the door means fully closes the cool air passage and fully opens the warm air passage;
    the pitch circle radius of a maximum heating position side part of the toothed portion of the driving side gear, which is meshed with a maximum heating position side part of the toothed portion of the driven side gear upon positioning of the door means in the maximum heating position, is smaller than the pitch circle radius of a maximum cooling position side part of the toothed portion of the driving side gear, which is meshed with a maximum cooling position side part of the toothed portion of the driven side gear upon placement of the door means in the maximum cooling position;
    the pitch circle radius of the maximum heating position side part of the driven side gear is larger than the pitch circle radius of the maximum cooling position side part of the drive side gear;
    an outer peripheral part of the driving side gear has a spiral shape;
    the driven side gear has a fan shape;
    the driving side gear further includes:
        a non-toothed smooth arcuate outer peripheral surface that extends in the predetermined circumferential direction from the maximum cooling position side part of the driving side gear, at which the pitch circle radius of the toothed portion of the driving side gear is maximized; and
        a stopper surface that extends in a radial direction of the driving side gear and is formed in one circumferential end of the non-toothed smooth arcuate outer peripheral surface, which is apart from the maximum cooling position side part of the driving side gear; and
    a circumferential end surface of the driven side gear, which extends in a radial direction of the driven side gear, contacts the stopper surface of the driving side gear in the maximum heating position of the door means.

2. The vehicle air conditioning system according to claim 1, wherein
    the pitch circle radius of the toothed portion of the driving side gear continuously and progressively changes between the maximum cooling position side part of the driving side gear and the maximum heating position side part of the driving side gear; and
    the pitch circle radius of the toothed portion of the driven side gear continuously and progressively changes between the maximum cooling position side part of the driven side gear and the maximum heating position side part of the driven side gear.

3. The vehicle air conditioning system according to claim 1, wherein:
    the door means includes a plate door that is rotatable about a rotatable shaft; and
    the driven side gear is secured to the rotatable shaft of the door means.

4. The vehicle air conditioning system according to claim 1, wherein the door drive mechanism further includes a drive servo motor, wherein the driving side gear is secured to an output shaft of the servo motor.

5. The vehicle air conditioning system according to claim 1, wherein
the pitch circle radius of each of the plurality of teeth of the driving side gear differs from the pitch circle radius of an adjacent one of the plurality of teeth of the driving side gear; and
the pitch circle radius of each of the plurality of teeth of the driven side gear differs from the pitch circle radius of an adjacent one of the plurality of teeth of the driven side gear.

6. The vehicle air conditioning system according to claim 1, wherein:
the plurality of teeth of the driving side gear includes:
  a first group of teeth, which has a predetermined pitch circle radius; and
  a second group of teeth, which is arranged right after the first group of teeth and has a predetermined pitch circle radius that is different from the predetermined pitch circle radius of the first group of teeth; and
the plurality of teeth of the driven side gear includes:
  a first group of teeth, which has a predetermined pitch circle radius; and
a second group of teeth, which is arranged right after the first group of teeth of the driven side gear and has a predetermined pitch circle radius that is different from the predetermined pitch circle radius of the first group of teeth of the driven side gear.

7. The vehicle air conditioning system according to claim 1, wherein each of the driving side gear and the driven side gear is molded from resin.

8. A vehicle air conditioning system comprising:
a case that conducts air toward a passenger compartment of a vehicle;
door means for controlling a flow of air in the case; and
a door drive mechanism that drives the door means, wherein:
the door drive mechanism includes:
  a driving side gear that includes a toothed portion, which has a plurality of teeth; and
  a driven side gear that includes a toothed portion, which has a plurality of teeth and is meshed with the toothed portion of the driving side gear;
the driven side gear is connected to the door means and is rotated to drive the door means upon rotation of the driving side gear;
a pitch circle radius of the toothed portion of the driving side gear progressively changes in a predetermined circumferential direction of the driving side gear; and
a pitch circle radius of the toothed portion of the driven side gear progressively changes in conformity with a change in the pitch circle radius of the toothed portion of the driving side gear, wherein
an outer peripheral part of the driving side gear has a spiral shape;
the driven side gear has a fan shape;
the driving side gear further includes:
  a non-toothed smooth arcuate outer peripheral surface that extends in the predetermined circumferential direction from a part of the driving side gear, at which the pitch circle radius of the toothed portion of the driving side gear is maximized; and
  a stopper surface that extends in a radial direction of the driving side gear and is formed in one circumferential end of the non-toothed smooth arcuate outer peripheral surface; and
a circumferential end surface of the driven side gear, which extends in a radial direction of the driven side gear, contacts the stopper surface of the driving side gear in one rotational direction of the door means.

* * * * *